US010675966B2

(12) United States Patent
Yamada

(10) Patent No.: US 10,675,966 B2
(45) Date of Patent: Jun. 9, 2020

(54) WHEEL DRIVING UNIT

(71) Applicant: TOYOTA JIDOSHA KABUSHIKI KAISHA, Toyota-shi, Aichi-ken (JP)

(72) Inventor: Masahiko Yamada, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/402,350

(22) Filed: May 3, 2019

(65) Prior Publication Data
US 2019/0351757 A1 Nov. 21, 2019

(30) Foreign Application Priority Data

May 16, 2018 (JP) .................. 2018-094564

(51) Int. Cl.
*B60K 7/00* (2006.01)
*F16H 57/04* (2010.01)
*B60K 17/04* (2006.01)

(52) U.S. Cl.
CPC .......... *B60K 7/0007* (2013.01); *B60K 17/043* (2013.01); *F16H 57/045* (2013.01); *F16H 57/0476* (2013.01)

(58) Field of Classification Search
CPC .......... B60K 7/0007; B60K 2007/0038; B60K 2007/0061
USPC ...................................... 180/65.51
See application file for complete search history.

(56) References Cited

U.S. PATENT DOCUMENTS

| | | | | |
|---|---|---|---|---|
| 7,228,928 B2* | 6/2007 | Mizutani | ................ | B60L 1/003 180/65.51 |
| 7,350,605 B2* | 4/2008 | Mizutani | .............. | B60K 7/0007 180/65.1 |
| 7,703,780 B2* | 4/2010 | Mizutani | ................ | B60G 3/20 280/124.1 |
| 7,828,095 B2* | 11/2010 | Murata | ............... | B60K 7/0007 180/65.1 |
| 7,950,483 B2* | 5/2011 | Murata | ............... | B60K 7/0007 180/65.51 |
| 7,975,789 B2* | 7/2011 | Murata | ................ | B60G 7/005 180/65.51 |
| 8,002,060 B2* | 8/2011 | Komatsu | .............. | B60K 7/0007 180/65.51 |
| 8,596,395 B2* | 12/2013 | Hirano | ................ | B60K 7/0007 180/65.51 |
| 8,720,623 B1* | 5/2014 | Kim | ..................... | B60K 17/043 180/65.51 |
| 8,733,483 B2* | 5/2014 | Yamamoto | ........... | B60K 7/0007 180/65.51 |
| 9,302,578 B2* | 4/2016 | Suzuki | ................ | B60K 7/0007 |
| 9,340,103 B2* | 5/2016 | Yukishima | ........... | B60K 7/0007 |

(Continued)

FOREIGN PATENT DOCUMENTS

JP    2015-155219 A    8/2015

*Primary Examiner* — Jeffrey J Restifo
(74) *Attorney, Agent, or Firm* — Sughrue Mion, PLLC

(57) ABSTRACT

A wheel driving unit including a casing in which an electric motor and a speed reducer are incorporated, the wheel driving unit being disposed in a rim of a wheel so as to rotate the wheel, wherein a portion of the wheel driving unit located below the electric motor and the speed reducer is a lubricant reservoir for storing lubricant in the casing, and wherein a protrusion is provided at a lower portion of the lubricant reservoir so as to protrude in a direction toward an inner circumferential surface of the rim.

7 Claims, 6 Drawing Sheets

(56) References Cited

U.S. PATENT DOCUMENTS

2010/0140020 A1\* 6/2010 Murahashi ............. B60B 11/06
 184/6.12
2010/0163319 A1\* 7/2010 Murata ................ B60K 7/0007
 180/55
2010/0187044 A1\* 7/2010 Nabeshima ............. B60B 11/06
 184/26

\* cited by examiner

FORWARD RUNNING
DIRECTION OF VEHICLE

FIG.6B
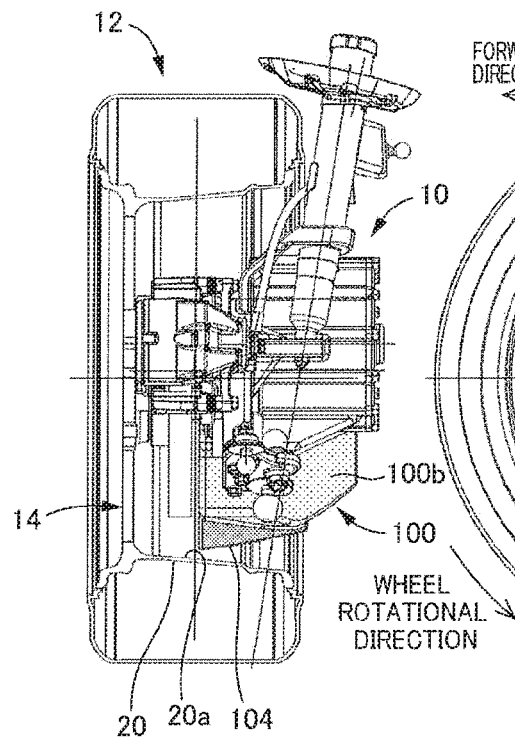
FIG.6A
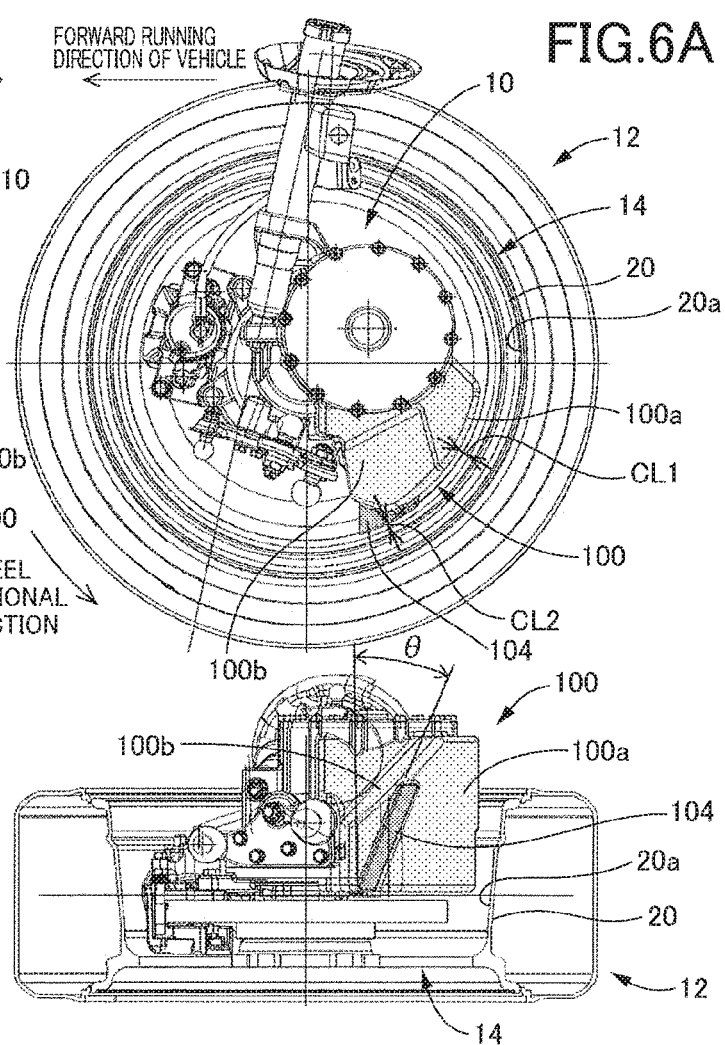
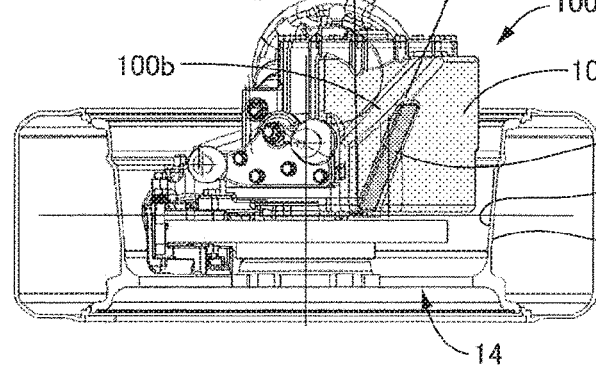
FIG.6C

WHEEL DRIVING UNIT

CROSS REFERENCE TO RELATED APPLICATION

The present application claims priority from Japanese Patent Application No. 2018-094564, which was filed on May 16, 2018, the disclosure of which is herein incorporated by reference in its entirety.

BACKGROUND

Technical Field

The following disclosure relates to a wheel driving unit disposed in a rim of a wheel to rotate the wheel.

Description of Related Art

Vehicles to drive a wheel by an electric motor have been actively developed in recent years. For instance, Japanese Patent Application Publication No. 2015-155219 describes a technique of disposing the electric motor in a rim of a wheel as what is called in-wheel motor. According to the technique, the electric motor, a speed reducer, an axle, etc., are unitized as a wheel driving unit, and the wheel driving unit is disposed in the rim of the wheel. The wheel driving unit is provided with an oil tank as a lubricant reservoir in which is stored lubricant for lubricating the speed reducer and the electric motor.

SUMMARY

From the viewpoint of ensuring good lubrication and permitting the lubricant to function as a coolant, it is desirable that the lubricant reservoir be as large as possible. In the case where the wheel driving unit having a relatively large lubricant reservoir is disposed in the rim of the wheel, however, a clearance between the lubricant reservoir and an inner circumferential surface of the rim of the wheel has to be inevitably small. In this case, it is expected that foreign matter of a certain size such as small stones and gravel enters or gets caught between the lubricant reservoir and the inner circumferential surface of the rim of the wheel when the vehicle is running Such entry or intrusion of the foreign matter may damage the lubricant reservoir and thereby impair utility of the wheel driving unit. Accordingly, the present disclosure is directed to a wheel driving unit having high utility.

In one aspect of the disclosure, a wheel driving unit includes a casing in which an electric motor and a speed reducer are incorporated, and the wheel driving unit is disposed in a rim of a wheel so as to rotate the wheel. A portion of the wheel driving unit located below the electric motor and the speed reducer is a lubricant reservoir for storing lubricant in the casing, and a protrusion is provided at a lower portion of the lubricant reservoir so as to protrude in a direction toward an inner circumferential surface of the rim.

Advantageous Effects

According to the wheel driving unit constructed as described above, the protrusion provided as described above prevents the foreign matter of a certain size from entering or getting caught between the lubricant reservoir and the inner circumferential surface of the rim. Thus, the wheel driving unit having high utility is constructed.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIGS. 6A-6C are views each illustrating a lubricant reservoir and a protrusion of the wheel driving unit.

DETAILED DESCRIPTION OF THE EMBODIMENT

Figure 1:
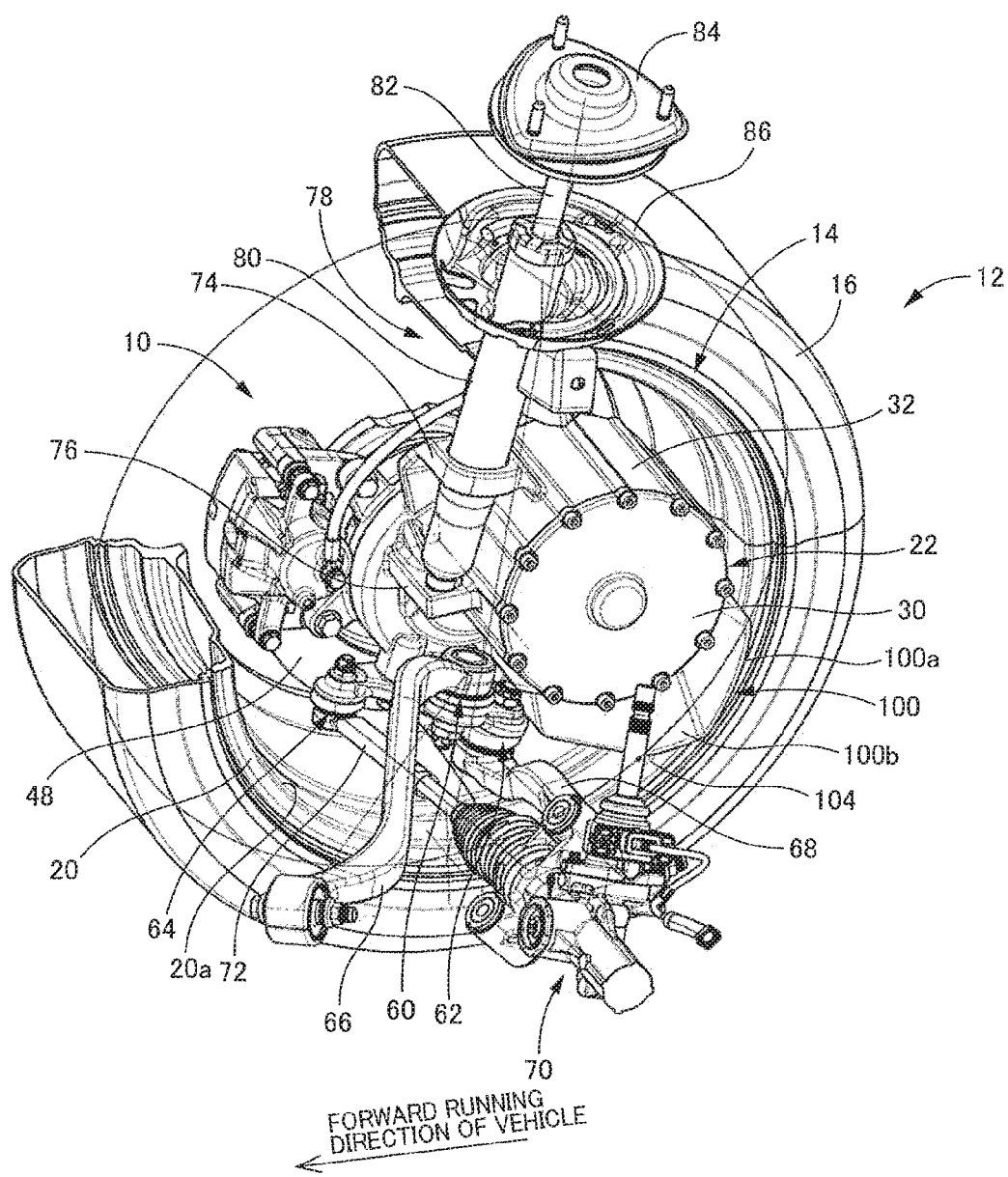
FIG. 1 is a perspective view of a wheel driving unit according to one embodiment in an installed state in which the wheel driving unit is installed on a vehicle.

Referring to the drawings, there will be explained below in detail a wheel driving unit according to one embodiment. It is to be understood that the invention is not limited to the details of the following embodiment but may be changed and modified based on the knowledge of those skilled in the art.

A. Structure of Wheel Driving Unit and State of Installation on Vehicle

As shown in FIG. 1, a wheel driving unit 10 according to one embodiment is installed on a vehicle for driving a wheel 12. FIG. 1 is a view of the wheel driving unit 10 as seen from an obliquely upper front side at a position near a widthwise center of the vehicle. The wheel 12 illustrated in FIG. 1 is a front right wheel in a four-wheel vehicle and a steerable wheel to be steered. In the following explanation, the wheel 12 is treated as including a wheel 14 and a tire 16 attached to the wheel 14. In FIG. 1, a forward moving direction (an advancing direction) of the vehicle is indicated by an arrow. In the following explanation, terms "front side" of the vehicle and "rear side" of the vehicle are defined with respect to the forward moving direction of the vehicle. Further, terms "front" "rear", "forward", and "rearward" used hereinafter are similarly defined.

Figures 3A, 3B:
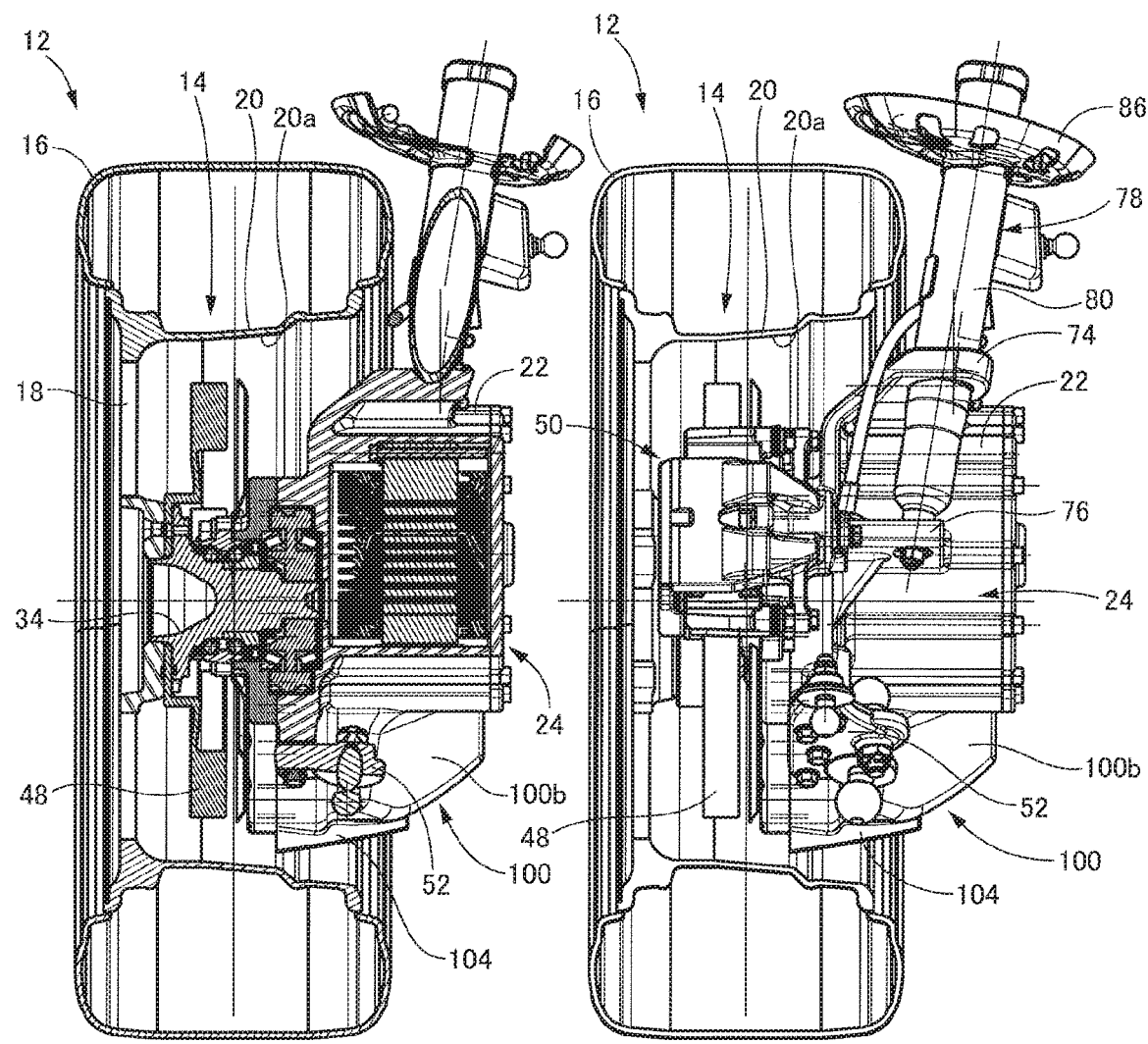
FIGS. 3A and 3B are respectively a front view and a cross-sectional view of the wheel driving unit in the installed state as seen from a front side of the vehicle.
Figures 4A, 4B:
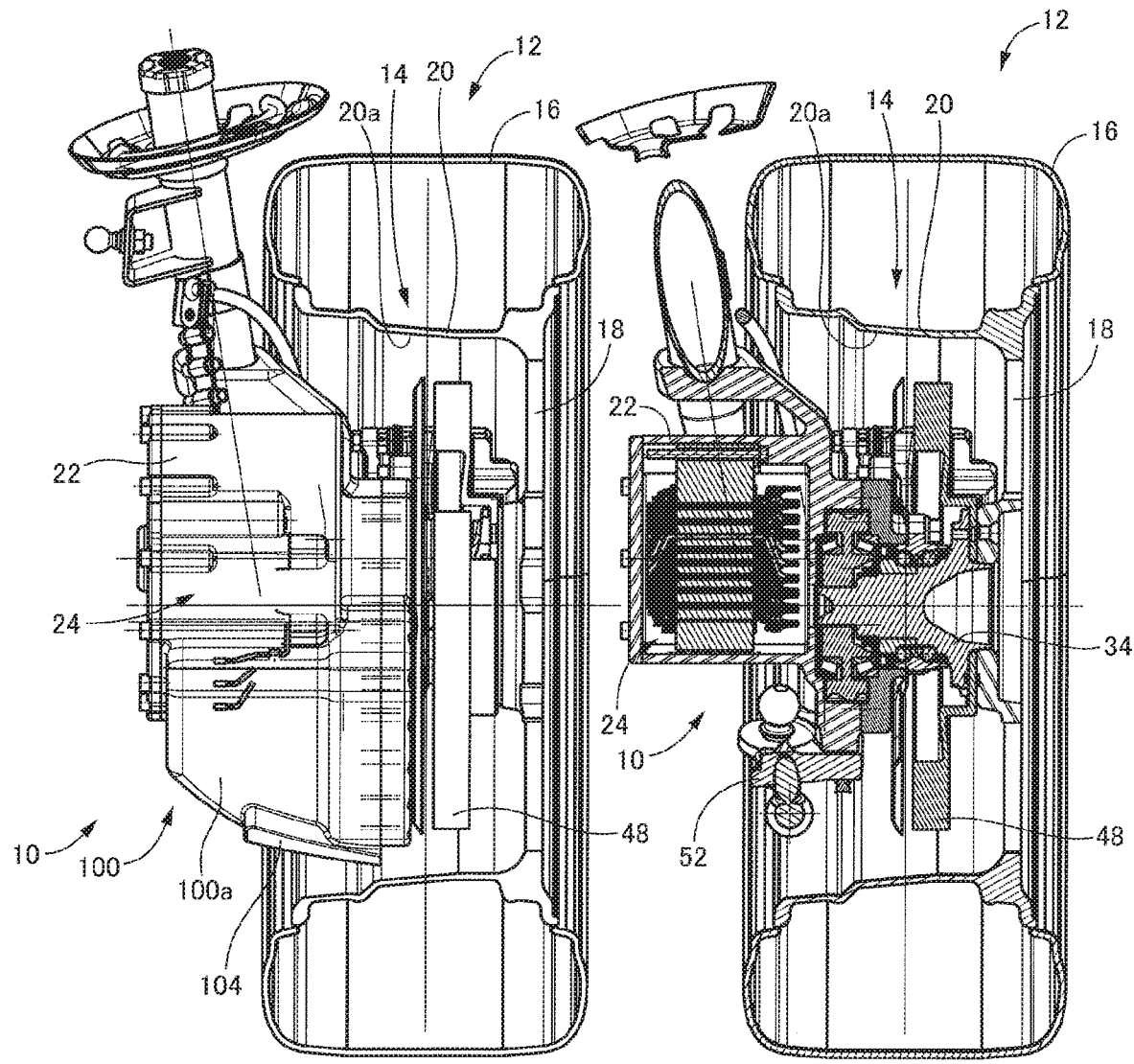
FIGS. 4A and 4B are respectively a rear view and a cross-sectional view of the wheel driving unit in the installed state as seen from a rear side of the vehicle.

The wheel driving unit 10 of the present embodiment will be explained referring also to FIG. 2 which is a view (front elevational view) of the wheel driving unit 10 as seen from the widthwise center of the vehicle, FIGS. 3A and 3B which are respectively a front view and a cross-sectional view of the wheel driving unit 10 as seen from the front side of the vehicle, and FIGS. 4A and 4B which are respectively a rear view and a cross-sectional view of the wheel driving unit 10 as seen from the rear side of the vehicle. The wheel 14 includes a generally circular disc 18 and a generally cylindrical rim 20 that are integral to each other. Specifically, the disc 18 is integral to the rim 20 at an outer end of the rim 20 in a vehicle width direction, namely, at one of opposite ends of the rim 20 in the vehicle width direction that is farther from a vehicle body, and an inner end of the rim 20 in the vehicle width direction, namely the other of the opposite ends of the rim 20 in the vehicle width direction that is closer to the vehicle body, is an open end. That is, the rim 20 is shaped so as to be open at its inner end in the vehicle width direction. The wheel driving unit 10 is disposed in a space defined by an inner circumferential surface 20a of the rim 20, namely, the wheel driving unit 10 is disposed in the rim 20.

Figure 5:
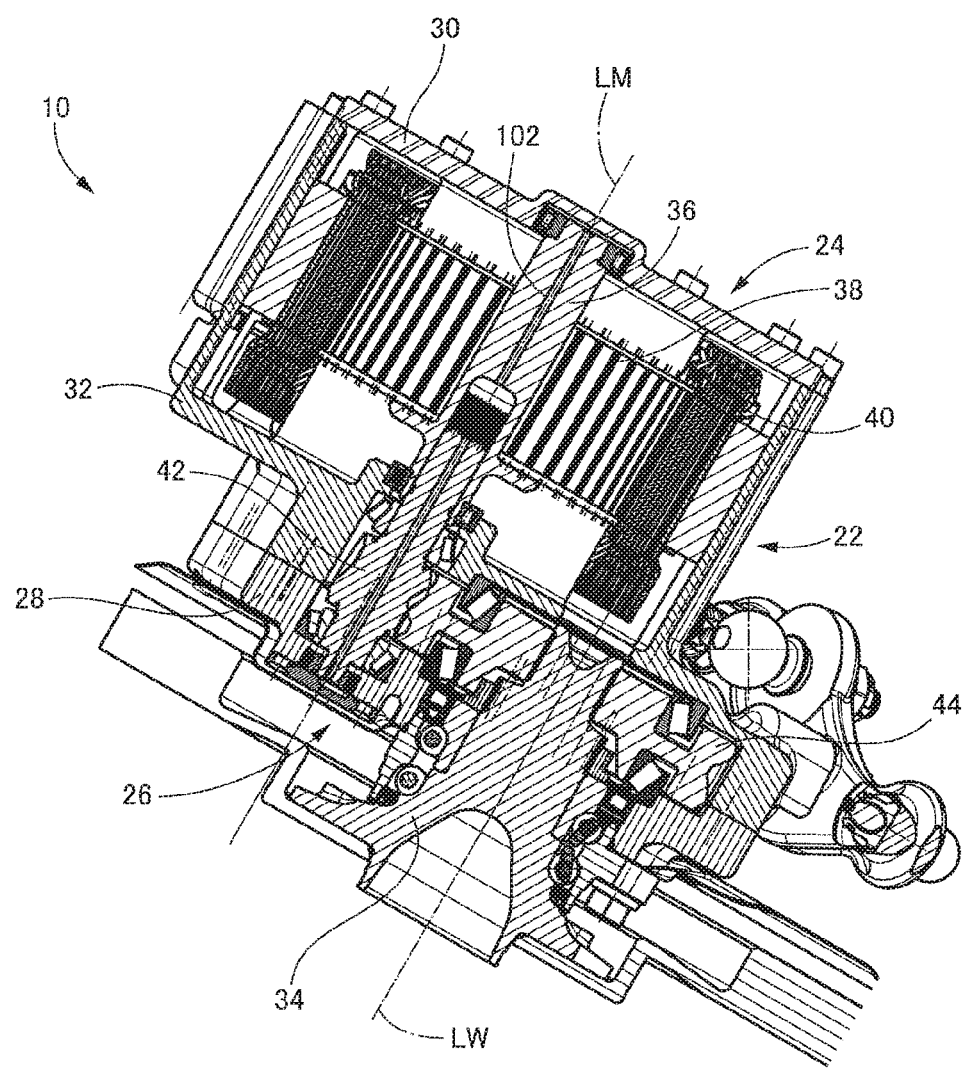
FIG. 5 is a cross-sectional view for explaining an internal structure of the wheel driving unit.

Referring also to the cross-sectional view of FIG. 5 for explaining an internal structure of the wheel driving unit 10, the wheel driving unit 10 includes: a casing 22; and an electric motor 24 and a speed reducer 26 incorporated in the casing 22. That is, there are formed, in the casing 22, a space in which the electric motor 24 is disposed and a space in which the speed reducer 26 is disposed.

The casing 22 is constituted by a generally plate-like base 28, a lid 30, and a generally cylindrical circumferential wall 32 whose one end is closed by the base 28 and the other end is closed by the lid 30. The base 28 rotatably holds an axle hub 34 which is fastened, at a hub portion thereof, to the disc 18 of the wheel 14. FIG. 5 is a cross-sectional view of the wheel driving unit 10 cut along a plane including both of an axis LM of the electric motor 24 (hereinafter referred to as "motor axis LM" where appropriate) and an axis LW of the axle hub 34 (hereinafter referred to as "wheel axis LW" where appropriate).

The electric motor 24 is a three-phase DC brushless motor and includes a motor shaft 36 rotatably held by the circumferential wall 32, magnets 38 fixed to an outer circumference of the motor shaft 36, and coils 40 fixed to an inner surface of the circumferential wall 32 so as to surround the magnets 38. The speed reducer 26 is constituted by: a pinion 42 configured to rotate together with the motor shaft 36; and a gear 44 meshing with the pinion 42 and configured to rotate together with the axle hub 34.

Figure 2:
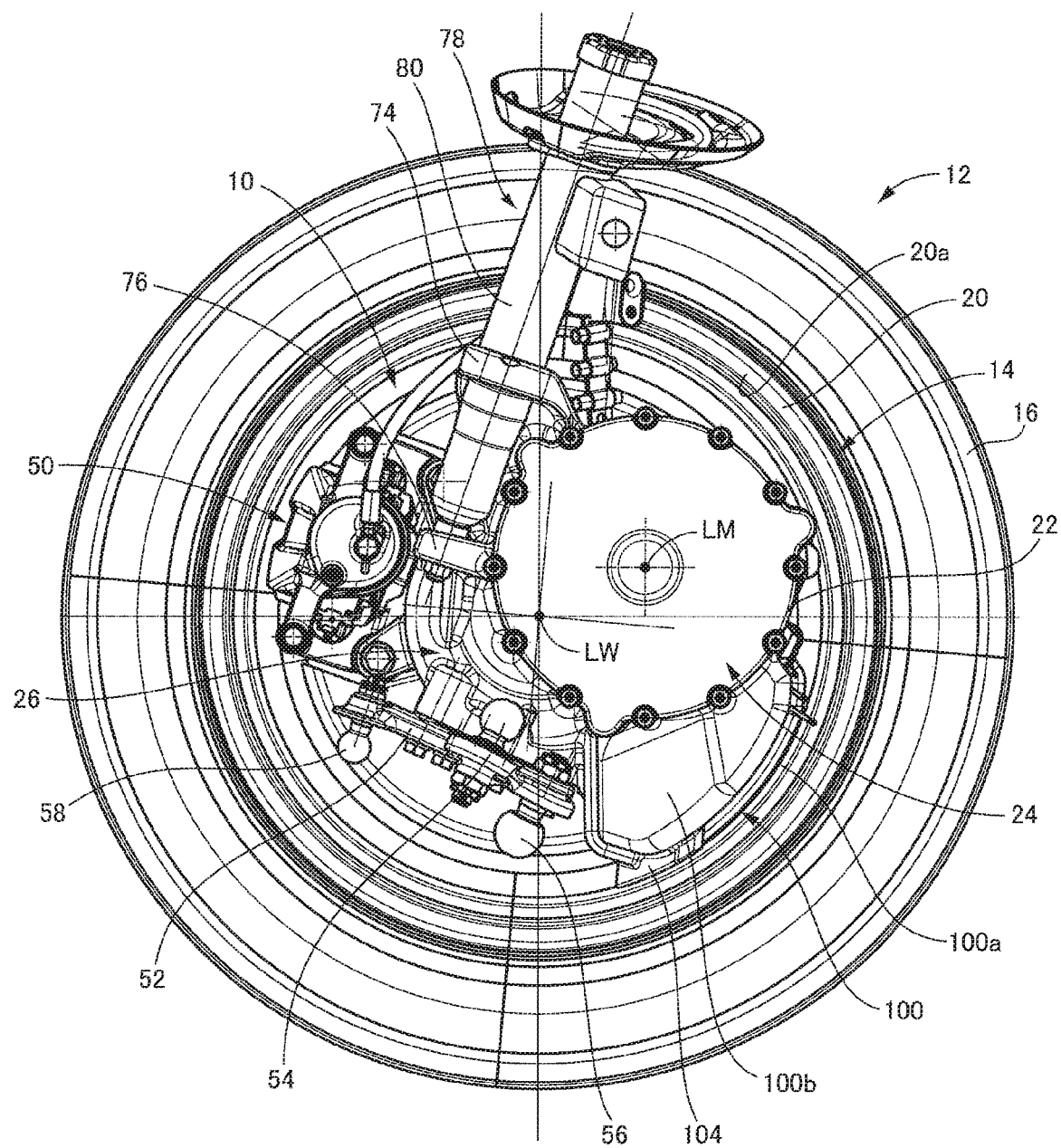
FIG. 2 is a view of the wheel driving unit in the installed state as seen from a widthwise center of the vehicle.

As apparent from FIGS. 2-4, a disc rotor 48 is disposed so as to be interposed between the axle hub 34 and the disc 18 of the wheel 14. A brake caliper 50 of a hydraulic brake device is held by the base 28 of the casing 22 so as to straddle the disc rotor 48.

A seat plate 52 is fixed to a lower portion of the circumferential wall 32 of the casing 22. Three ball studs 54, 56, 58 are fixed to the seat plate 52. As shown in FIG. 1, the ball studs 54, 56, 58 are constituent components of respective ball joints 60, 62, 64, and the seat plate 52 is connected to a first suspension lower arm 66 (hereinafter referred simply to as "arm 66" where appropriate), a second suspension lower arm 68 (hereinafter referred simply to as "arm 68"), and a link rod 72 extending from a steering actuator 70 respectively via the ball joints 60, 62, 64.

As apparent from FIGS. 1 and 2, two brackets 74, 76 are provided at a front-side portion of an outer surface of the circumferential wall 32. The brackets 74, 76 fixedly hold a lower portion of a shock absorber 78. Specifically, the shock absorber 78 includes a cylinder 80 and an absorber rod 82 extending upward from the cylinder 80. The two brackets 74, 76 fixedly hold a lower portion of the cylinder 80. As shown in FIG. 1, an upper end of the absorber rod 82 is rotatably held by a mount portion 84 of the vehicle body. A spring seat 86 is attached to an upper portion of the cylinder 80, and a suspension coil spring (not shown) is disposed between the spring seat 86 and the mount portion 84. That is, the present wheel driving unit 10 functions as a steering knuckle in a suspension apparatus of strut type (MacPherson type).

As apparent from FIG. 2, in the present wheel driving unit 10, the motor axis LM is located more rearward than the wheel axis LW in a state in which the wheel driving unit 10 is installed on the vehicle. That is, the electric motor 24 is disposed in the rim 20 so as to be shifted toward the rear side of the vehicle.

B. Lubricant Reservoir and Protrusion Thereof

As explained above, the present wheel driving unit 10 incorporates the speed reducer 26. For lubrication of the speed reducer 26 and the electric motor 24, lubricant is circulated in the wheel driving unit 10. To this end, the wheel driving unit 10 is provided with a lubricant reservoir 100 as an oil tank. In the wheel driving unit 10, a space is formed in the casing 22 below the electric motor 24 and the speed reducer 26 such that the space in question is connected to both of the space in which the electric motor 24 is disposed and the space in which the speed reducer 26 is disposed. In other words, the casing 22 is shaped to protrude downward below the electric motor 24 and the speed reducer 26, so as to form the space. That is, the lubricant reservoir 100 is constituted by the space and a portion of the casing 22 that defines the space.

Though invisible in FIG. 5, the wheel driving unit 10 incorporates a small-size trochoid pump. The lubricant stored in the lubricant reservoir 100 is sucked up by the trochoid pump. The sucked lubricant passes through an oil passage 102 formed in the motor shaft 36 and the pinion 42, so as to be spread over the electric motor 24 and the speed reducer 26. The spread lubricant drops by its own weight and returns hack to the lubricant reservoir 100. That is, the lubricant functions also as a coolant for cooling the electric motor 24 and the speed reducer 26.

FIGS. 6A-6C illustrate an external appearance of the lubricant reservoir 100. FIGS. 6A-6C are views of the wheel 12 and the wheel driving unit 10 as seen from the widthwise center of the vehicle (i.e., from a vehicle body side), from the front side, and from below, respectively. In each of FIGS. 6A-6C, a lightly shaded portion is the lubricant reservoir 100. As explained above, the lubricant reservoir 100 is located below the electric motor 24 and the speed reducer 26.

The seat plate 52 is located so as to extend from generally right underneath the wheel axis LW toward the front side of the vehicle. Thus, the lubricant reservoir 100 is disposed rearward of a position that is right underneath the wheel axis LW. The lubricant reservoir 100 is desirably sized as largely as possible for ensuring the lubricating and cooling function described above. Thus, a lower outer circumferential surface 100a of the lubricant reservoir 100 extends toward the rear side of the vehicle along the inner circumferential surface of the rim 20. A clearance CL1 between the lower outer circumferential surface 100a and the inner circumferential surface 20a of the rim 20 is made small to a certain extent. In the meantime, the lubricant reservoir 100 is shaped such that its front-side portion is cut off for preventing interference between the lubricant reservoir 100 and the lower arm 68 when the wheel 12 is steered. Specifically, a front-side inclined surface 100b of the lubricant reservoir 100 is inclined such that a portion of the front-side inclined surface 100b closer to the vehicle body is located more rearward than a portion thereof farther from the vehicle body. As later explained in detail, a protrusion 104 (illustrated as a densely shaded portion in FIGS. 6A-6C) is provided at the lower portion of the lubricant reservoir 100. The protrusion 104 protrudes generally downward, in other words, protrudes in a direction toward the inner circumferential surface 20a of the rim 20, from the lower outer circumferential surface 100a of the lubricant reservoir 100.

Here, a wheel driving unit without the protrusion 104 is considered. When the vehicle is running, small stones, gravel and the like on the road surface (hereinafter referred to as "foreign matter" where appropriate) may enter the wheel 14. The foreign matter entered the wheel 14 tends to move around in the wheel 14 by rotation of the wheel 14, namely, the foreign matter entered the wheel 14 rotates together with the inner circumferential surface 20a of the rim 20 by rotation of the inner circumferential surface 20a. Here, only a case is considered in which the vehicle is running forward. In the case where the foreign matter is somewhat larger than the clearance CL1, the foreign matter hits on the front-side inclined surface 100b of the lubricant reservoir 100 and gets out of the wheel 14 from the opening of the rim 20. In the case where the foreign matter is considerably smaller than the clearance CL1, the foreign matter passes through between the lower outer circumferential surface 100a of the lubricant reservoir 100 and the inner circumferential surface 20a of the rim 20. However, in the case where the foreign matter has substantially the same size as the clearance CL1 or is slightly larger or smaller than the clearance CL1, the foreign matter gets into between the outer circumferential surface 100a of the lubricant reservoir 100 and the inner circumferential surface 20a of the rim 20. In other words, it is expected that the foreign matter gets caught between the outer circumferential surface 100a of the lubricant reservoir 100 and the inner circumferential surface 20a of the rim 20. The foreign matter that gets into between the outer circumferential surface 100a of the lubricant reservoir 100 and the inner circumferential surface 20a of the rim 20 may lead to damage of the lubricant reservoir 100, in other words, such entry or intrusion of the foreign matter may damage the lubricant reservoir 100.

In view of such entry or intrusion of the foreign matter, the present wheel driving unit 10 is provided with the protrusion 104. The protrusion 104 is provided at the lower portion of the front-side portion of the lubricant reservoir 100. Specifically, the protrusion 104 is provided at a front-side end portion of the outer circumferential surface 100a. A clearance CL2 between the protrusion 104 and the inner circumferential surface 20a of the rim 20 is smaller than the clearance CL1 between the outer circumferential surface 100a of the lubricant reservoir 100 and the inner circumferential surface 20a of the rim 20. The inner circumferential surface 20a of the rim 20 becomes broadened toward the open end of the rim 20. In a strict sense, the protrusion 104 protrudes such that the clearance CL2 is smaller than the clearance CL1 on any plane as long as the plane is perpendicular to the wheel axis LW.

Owing to the provision of the protrusion 104 described above, the foreign matter larger than the clearance CL2 does not enter between the outer circumferential surface 100a of the lubricant reservoir 100 and the inner circumferential surface 20a of the rim 20, so that the entry of the foreign matter that may lead to damage of the lubricant reservoir 100 is prevented. In this respect, the foreign matter smaller than the clearance CL2 easily passes or slips through between the outer circumferential surface 100a of the lubricant reservoir 100 and the inner circumferential surface 20a of the rim 20 as the wheel 14 is rotated.

A portion of the casing 22 corresponding to the lubricant reservoir 100 protrudes toward the vehicle body side from the open end of the rim 20, and the protrusion 104 accordingly extends toward the vehicle body side from the open end of the rim 20. That is, the protrusion 104 extends throughout a region in which the lubricant reservoir 100 and the inner circumferential surface 20a of the rim 20 are opposed to each other from one end of the region in a direction in which the axis of the wheel (the wheel axis LW) extends to the other end thereof in the direction. Accordingly, the entry of the foreign matter described above is prevented with high reliability.

The clearance CL2 between the protrusion 104 and the inner circumferential surface 20a of the rim 20 is not limited to a specific size, but the size of the clearance CL2 may be suitably set for attaining the purpose of preventing the entry of the foreign matter by the protrusion 104. For instance, the protrusion 104 is provided such that the size of the clearance CL2 falls within a range from not smaller than ⅓ of the clearance CL1 to not larger than ⅔ of the clearance CL1.

The protrusion 104 is provided at the front-side end portion of the outer circumferential surface 100a, namely, at an upstream end portion of the outer circumferential surface 100a in the rotational direction of the wheel 14 in forward running of the vehicle, thus effectively preventing the entry of the foreign matter. When the foreign matter rotates together with the inner circumferential surface 20a of the rim 20 by the rotation of the rim 20, the foreign matter hits on the protrusion 104 from the upstream side in the rotational direction of the wheel 14 if the foreign matter is larger than the clearance CL2. For efficiently discharging the foreign matter that hits on the protrusion 104 out of the rim 20, the protrusion 104 is inclined with respect to the axis of the wheel 14, i.e., the wheel axis LW. Specifically, the protrusion 104 is inclined such that a portion thereof closer to the open end of the rim 20 is located more rearward than a portion thereof closer to the disc 18, namely, than a portion thereof farther from the open end of the rim 20. As shown in FIG. 6C, the protrusion 104 is inclined at an inclined angle θ with respect to the wheel axis LW. In this respect, in view of the effect of discharging the foreign matter out of the rim 20 and the demand for a larger size of the lubricant reservoir 100, the inclined angle θ desirably falls within a range from not smaller than 20° to not larger than 45°.

The present wheel driving unit 10 is constructed such that the protrusion 104 is formed integrally with the lubricant reservoir 100. Specifically, the circumferential wall 32 of the casing 22 is formed by casting such that a portion corresponding to the protrusion 104 has a larger thickness. That is, the strength of the portion of the casing 22 corresponding to die protrusion 104 is increased. Accordingly, even when relatively large foreign matter hits on the protrusion 104, the portion of the casing 22 corresponding to the protrusion 104 is prevented from being easily deformed.

C. Modification

The protrusion 104 of the wheel driving unit 10 according to the illustrated embodiment is formed integrally with the lubricant reservoir 100. The protrusion may be a member prepared separately from the casing and may be attached to the lubricant reservoir by bonding, for instance.

The wheel driving unit 10 according to the illustrated embodiment is configured to drive the front wheel as the steerable wheel. The wheel driving unit according to the present disclosure may be configured to drive a rear wheel. The shape and layout of the lubricant reservoir vary depending on the wheel on which the wheel driving unit is to be installed. Accordingly, the protrusion may be provided such that the protrusion is disposed at an appropriate position and such that the clearance between the protrusion and the inner circumferential surface of the rim has a suitable size, in consideration of the shape and layout.

What is claimed is:

1. A wheel driving unit including a casing in which an electric motor and a speed reducer are incorporated, the wheel driving unit being disposed in a rim of a wheel so as to rotate the wheel,
   wherein a portion of the wheel driving unit located below the electric motor and the speed reducer is a lubricant reservoir for storing lubricant in the casing,
   wherein a protrusion is provided at a lower portion of the lubricant reservoir so as to protrude from an outer circumferential surface of the lubricant reservoir in a direction toward an inner circumferential surface of the rim, and
   Wherein the protrusion has an elongated shape, so as to deflect foreign matter from entering a clearance between the outer circumferential surface of the lubricant reservoir and the inner circumferential surface of the rim.

2. The wheel driving unit according to claim 1, wherein the protrusion is provided at the lower portion of a front-side portion of the lubricant reservoir.

3. The wheel driving unit according to claim 1, wherein the protrusion extends throughout a region in which the lubricant reservoir and the inner circumferential surface of the rim are opposed to each other from one end of the region in a direction in which an axis of the wheel extends to the other end thereof in the direction.

4. The wheel driving unit according to claim 1, wherein the protrusion is provided so as to be inclined with respect to an axis of the wheel such that a part of the protrusion closer to an open end of the rim is located more rearward than a part thereof farther from the open end of the rim.

5. The wheel driving unit according to claim 4, wherein an angle of inclination between an axis of the protrusion extending along the elongated shape and the axis of the wheel is 20-45 degrees.

6. The wheel driving unit according to claim 1, wherein the protrusion is a thickened portion of a wall that forms the outer circumferential surface of the lubricant reservoir.

7. The wheel driving unit according to claim 1, wherein the protrusion protrudes downward from the lower outer circumferential surface of the lubricant reservoir.

* * * * *